United States Patent [19]

Fujii et al.

[11] Patent Number: 4,796,059

[45] Date of Patent: Jan. 3, 1989

[54] IMAGE FORMING APPARATUS WITH MAGNIFICATION CHANGING DEVICE

[75] Inventors: Yozo Fujii; Taku Saito, both of Hachioji, Japan

[73] Assignee: Konica Corporation, Tokyo, Japan

[21] Appl. No.: 148,681

[22] Filed: Jan. 26, 1988

[30] Foreign Application Priority Data

Jan. 28, 1987 [JP] Japan .............................. 62-11149[U]
Feb. 18, 1987 [JP] Japan .............................. 62-36692

[51] Int. Cl.⁴ ...................... G03B 27/34; G03B 27/40; G03B 27/70

[52] U.S. Cl. .................................................... 355/57

[58] Field of Search .................... 355/8, 11, 51, 57, 60

[56] References Cited

U.S. PATENT DOCUMENTS 4,355,883 10/1982 Landa .................................... 355/8
4,494,866 1/1985 Rattin et al. .......................... 355/57
4,538,903 9/1985 Lane ...................................... 355/57
4,538,904 9/1985 Lane ...................................... 355/57
4,561,770 12/1985 Yamaguchi et al. ................. 355/57
4,629,310 12/1986 Landa et al. ........................... 355/8

*Primary Examiner*—Richard A. Wintercorn
*Attorney, Agent, or Firm*—Frishauf, Holtz, Goodman & Woodward

[57] ABSTRACT

An image forming apparatus with a magnification changing mechanism for an optical system wherein a first carriage carrying a lamp and a mirror for scanning an image of a document, a second carriage adapted to run in the same direction but at a half speed of the first carriage and carrying a V-mirror, and a lens for projecting the image of the document are provided. A V-mirror position changing device includes a block carriage disposed at an end of a closed loop wire for driving the first and second carriages, and a stationary block disposed on a body frame in a manner to correspond to adjoining blocks disposed on the block carriage. The wire is made to run on the blocks of the block carriage and the stationary block, and the terminal end of the wire is fixed on the block carriage.

4 Claims, 4 Drawing Sheets

IMAGE FORMING APPARATUS WITH MAGNIFICATION CHANGING DEVICE

BACKGROUND OF THE INVENTION

1. Field of the Invention

The present invention relates to an image forming apparatus and, more particularly, to an image forming apparatus with a magnification changing device.

2. Description of the Prior Art

As the magnification changer of an image forming apparatus, there exist a device using a zoom lens and a device changing the length of a total optical path, the latter of which can establish a wider magnification change than the former at a lower cost so that it is adopted in a high-performance apparatus. An electrophotographic reproducing machine employed in this style will be described with reference to FIGS. 3, 4 and 5.

The machine is arranged with: a first carriage A as first running means adapted to run at a scanning speed while carrying a light source lamp 2 and a mirror 4 for irradiating a document on a document glass plate 80; a guide rail (not shown) for said first carriage A; a second carriage B as second running means movable with running blocks 12 and adapted to run in the same direction as the first one A while carrying mirrors 5 and 6 (which are generally called collectively a "V-mirror"); a guide rail (not shown) for said second carriage; a block carriage 70 made movable in the same direction as the first carriage for changing the position of the V-mirror to change the magnification; a lens carriage 40 carrying a projection lens 7; a mirror 8; and a photosensitive drum 9 for providing a focal plane.

When the lens carriage 40 and the block carriage 70 are moved, the V-mirror 5 and 6, i.e., the initial position of the second carriage B and the lens 7 are set in the respective positions for non-enlargement, reduction and enlargement of sizes, as shown in FIG. 3.

Turning to FIG. 5, a wire is made to run on each of pulleys 11, which in turn are driven by a motor 10. The wire has its front half $W_1$ run on the running block 12 and, through an intermediate pulley, on a pulley 14 carried on the block carriage 70 until it is fixed to said carriage. On the other hand, the rear half $W_2$ of the wire is made to run through several pulleys on the aforementioned running block 12 in the direction opposite to the front half $W_1$. The rear wire half $W_2$ is further made to run, through an intermediate pulley, on a pulley 22 carried on the block carriage 70 until it is fixed on said carriage 70.

The power train described above is symmetrically provided also at the other side, as shown in FIG. 5.

In accordance with each magnification desired, on the other hand, the lens 7 on its carriage 40 is moved to and set in specific positions, as will be described with reference to FIG. 4. The rear wire half is made to run on a pulley 28 driven by a stepping motor 58 and is fixed through a pulley 32 on the lens carriage 40. The front wire half is made to run on pulleys 29, 30 and 31 and is likewise fixed on the lens carriage 40. A cam 85 is pivoted by the shaft of the pulley 30 so that it can rotate together with the pulley 30. As a result, the stepping motor is energized in accordance with a desired magnification to run the wire thereby to determine lens positions and corresponding cam angular positions. A cam follower 86 carried on the block carriage 70 is then pushed by the cam 85 to determine the initial position of the block carriage so that the initial position of the V-mirror is set in accordance with the lens position of each magnification, thus changing the magnification.

The movement of the block carriage 70 is doubled with respect to that of the initial position of the second carriage B, i.e., the V-mirror for changing a magnification. This movement increases with increasing change in the magnification. Specifically, the difference of the initial position of the V-mirror is about 60 mm between the magnification $M=0.5$ and $M=1$, and the movement of the block carriage 70 is doubled to about 120 mm. This means the large movement of the block carriage and the stroke of the cam 85. This accordingly enlarges the space to be occupied by those members, thus seriously obstructing the size reduction of the apparatus. This obstruction becomes more serious with larger change in the magnification.

SUMMARY OF THE INVENTION

An object of the present invention is to provide a magnification changing mechanism for an image forming apparatus, which is free from the troubles specified above.

This object can be achieved by an image forming apparatus with a magnification changing mechanism, comprising first running means carrying a lamp and a mirror for scanning an image of a document; a second running means adapted to run in the same direction but at a half speed of said first running means and carrying a mirror for reflecting again a light reflected from said first running means; and an optical system for projecting the image of said document on an image retainer through said mirrors; wherein means for changing the position of said second running means for changing the length of an optical path when the magnification is changed includes: a block carriage disposed at an end of a closed loop wire for driving said first and second running means; and a stationary block disposed on a body frame in a manner to correspond to adjoining blocks disposed on said block carriage, said wire being made to run on the blocks of said block carriage and said stationary block, the terminal end of said wire being fixed on said block carriage.

In case, on the other hand, the blocks are added to the block carriage whereas a stationary block is disposed on the body frame in a manner to correspond to those adjoining blocks such that the aforementioned wire is also made to run on the blocks of the block carriage and on the stationary block so that the blocks on their carriage may act as running ones, when the carriage is to be moved, to drastically reduce the movement of the block carriage and the stroke of the cam for actuating the block carriage, the image forming apparatus can be made compact, but the tension applied on the block carriage is increased.

Accordingly, a large difference in tension is generated in the different directions between wires connected to the block carriage during the scanning operation for exposure, especially at the start of the movement of the scanning member for exposure.

Further, in case that the difference in tension becomes larger than a force of a spring pushing the block carriage against the cam through the cam follower and acts in the reverse direction to the pushing force, the cam is liable to separate from the cam follower. If the cam is separated from the cam follower, the V-mirror is deviated from the normal position, so that the optical path from the document to the lens becomes improper for the correct focusing conditions and no image having a predetermined image resolving power is formed on the image retainer.

Another object of the present invention is to provide a magnification changing mechanism for an image forming apparatus, which can eliminate those drawbacks to ensure stable operations and form images of high quality.

This object can be achieved by an image forming apparatus with a magnification changing mechanism, which comprises: first running means carrying a lamp and a mirror for scanning an image of a document; second running means adapted to run in the same direction but at one half speed of said first running means and carrying a mirror for reflecting again a light reflected from said first running means; and an optical system for projecting the image of said document on an image retainer through said mirrors, wherein the improvement comprises means for fixing a portion of said magnification changing mechanism when said optical system is in an exposure operation.

DESCRIPTION OF THE PREFERRED EMBODIMENTS

Figure 1:
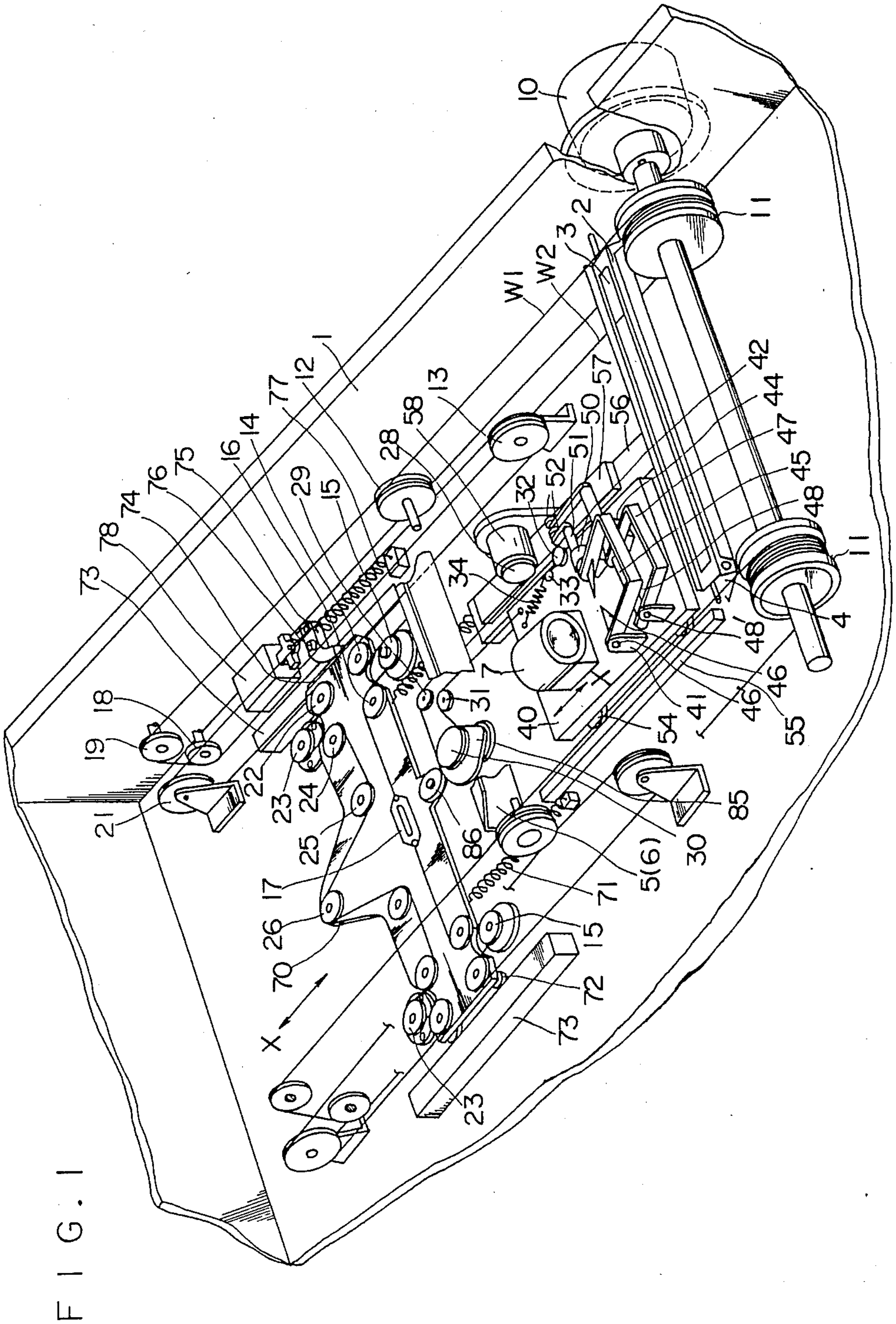
FIG. 1 a perspective view showing an image projecting mechanism into which is incorporated one embodiment of the present invention.

One embodiment of the present invention will be described with reference to FIGS. 1, 2 and 6. In these Figures, parts having the same functions as those of the prior art are designated by the common reference numerals.

Figure 2:
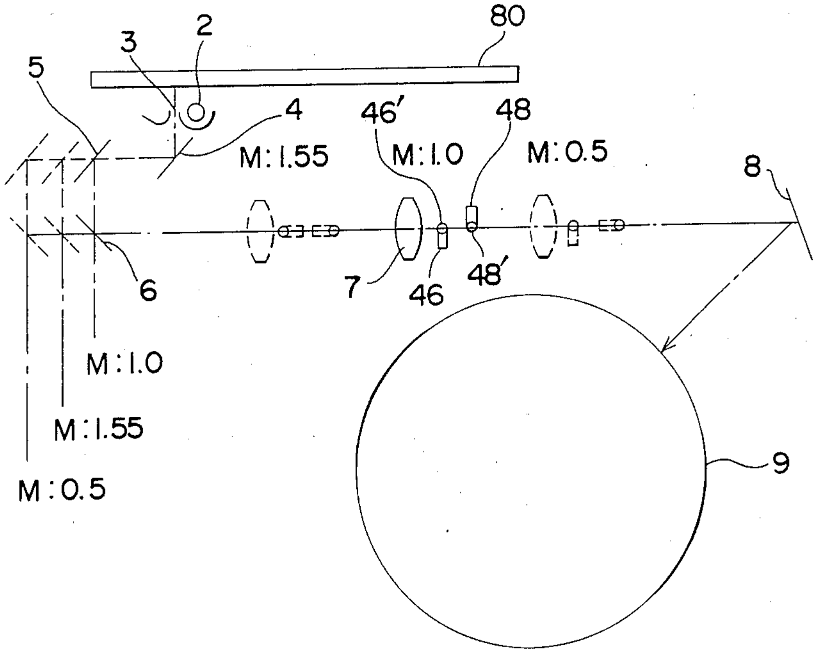
FIG. 2 is a schematic diagram showing the related portion of the image forming apparatus into which is incorporated one embodiment of the present invention.
Figure 3:
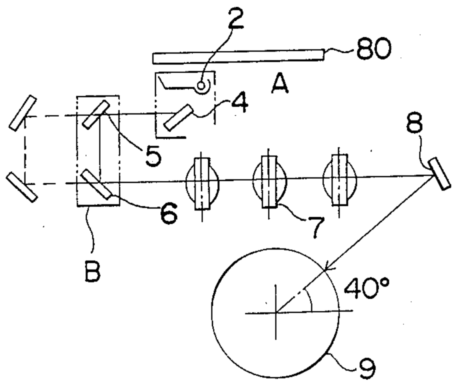
FIG. 3 is a schematic diagram showing the image forming apparatus having the optical path length changing type magnifying mechanism of the existing type.
Figure 4:
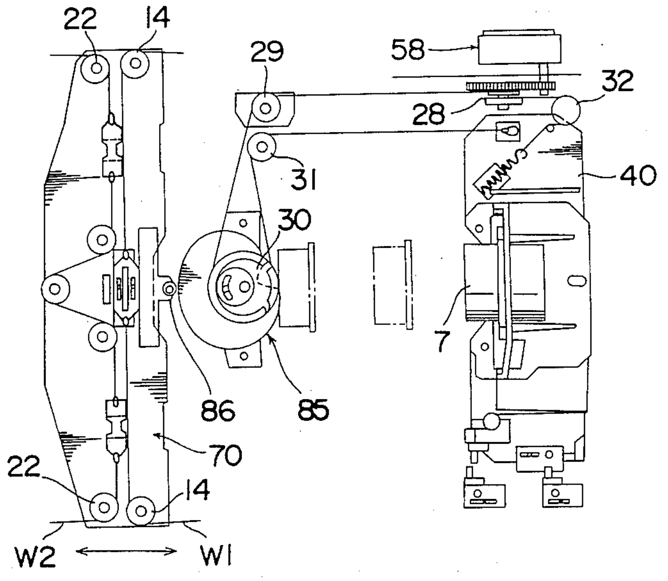
FIG. 4 PRIOR ART
FIG. 4 is a schematic diagram showing the magnification changing mechanism of the prior art.
Figure 5:
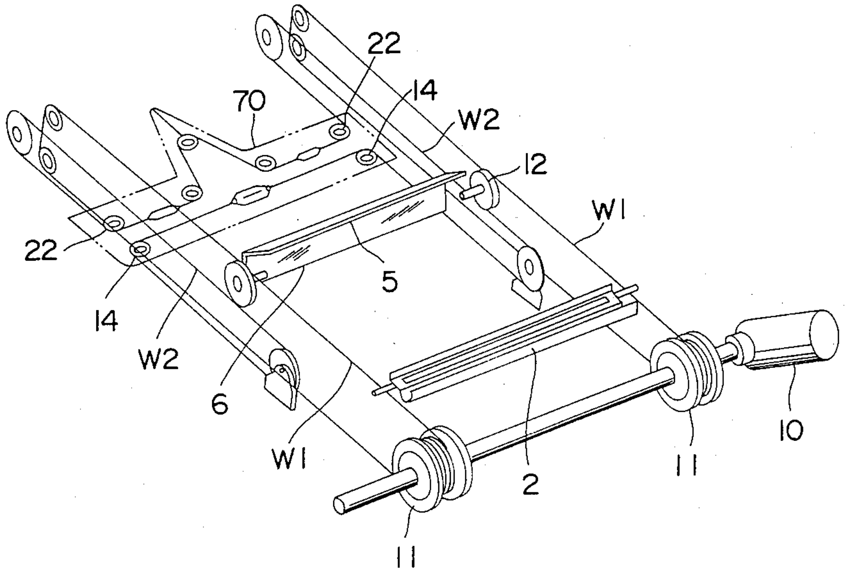
FIG. 5 PRIOR ART
FIG. 5 is a perspective view showing the running states of the wires for actuating the exposure scan of the prior art.

FIG. 2 is a schematic view showing the related portion of the image forming apparatus into which is incorporated the magnification changing mechanism of the present invention.

The document image on a document glass plate 80 is irradiated with a lamp 2 on a first carriage A. The reflected light passes through a slit 3 and a mirror 4 and further through a V-mirror 5 and 6 on a second carriage B running at a half speed of the first carriage A, until it is focused on the surface of a photosensitive drum 9 through a projection lens 7, a light distribution adjustor 46, a light amount adjustor 48 and a mirror 8.

In the image projecting mechanism of the image forming apparatus thus constructed, the magnification M of the projected image is made variable with respect to the document, and the positions of the projection lens 7 and the V-mirror 5 and 6 are determined with respect to each of the magnifications selected. In the case of $M=1$, for example, the position of the V-mirror 5 and 6 at the start of the scanning operation and the fixed position of the lens 7 are illustrated by solid lines in FIG. 2.

Moreover, the value of the magnification M can be finely changed in a continuous manner. However, here will be exemplified by $M=1$, $M=1.55$ for enlargement and $M=0.5$ for reduction. The arrangements of the lens 7 and the mirror 5 and 6 for $M=1.55$ and $M=0.5$ are illustrated by broken lines in FIG. 2. The differences in the positions of the V-mirror 5 and 6, i.e., the second carriage B are 58.75 mm between when $M=1$ and $M=0.5$ and 22.93 mm between when $M=1$ and $M=1.55$. The differences in the fixed positions of the projection lens 7 are 117.5 mm between when $M=1$ and $M=0.5$ and 129.25 mm between when $M=1$ and $M=1.55$.

Next, the mechanism for moving the first and second carriages and for changing the starting point of the second carriage B during the scanning operation for exposure and the set position of the projection lens for each change in the magnification will be described in the following.

In the drive train of the scanning system, as shown in FIG. 1, a single wire is made to run on a pulley 11 which is mounted on the shaft of a stepping motor 10 (through a not-shown clutch brake). The wire has its front half $W_1$ running on a pulley 12 until it is fixed on a block carriage 70 by means of a fastener 17 through pulleys 13, 14, 15 and 16. Incidentally, the aforementioned pulleys 14 and 16 are carried on the block carriage whereas the remaining pulleys except the pulley 12 carried on the second carriage B are made rotatable on the shafts fixed in a body 1.

On the other hand, the rear half $W_2$ of the wire running on the pulley 11 is made to run on pulleys 18 and 19 and the aforementioned pulley 12 in the direction opposite to that of the wire half $W_1$ and further on a pulley 26 (for tensing the wire, although not shown) of the block carriage 70 through pulleys 21, 22, 23, 24 and 25 until it is connected to a symmetric wire, as will be described, thus forming a closed loop. The pulleys 22, 24, 25 and 26 are carried on the block carriage 70.

Another set of similar pulleys are symmetrically arranged at the opposite side, as shown in FIG. 1, to run similar wires $W_1$ and $W_2$ so that equal driving powers are applied on the both sides of the wires.

The wire $W_1$ is connected to the first carriage A on which are carried the lamp 2, the slit 3 and the mirror 4, and the pulley 12 is pivotted by the shaft which is fitted in the second carriage B carrying the V-mirror 5 and 6. Moreover, these first and second carriages can be moved while being guided by rails which extend, although not shown, in the running direction (as indicated by arrow X) of the carriages. On the other hand, the block carriage 70 can also be moved in the direction of the arrow X while having its rollers 72 guided by rails 73 disposed at both sides, as shown in FIG. 1.

Moreover, a lens carriage 40 carrying the projection lens, the light distribution adjustor and the light amount adjustor can also be moved in the direction X while having its rollers 54 guided by rails 55 and 56.

A pulley 33 is disposed on the lens carriage 40, to which is fixed one end of a wire through a spring 34. This wire is made to run through a pulley 32 on a pulley 28 which is driven by a drive motor 58. This wire is further made to run through a pulley 29 on a pulley 30, which is fixed on the shaft of a cam 85, and on a pulley 31 until its other end is fixed again on the lens carriage 40.

As the setting of the magnification M is changed, the stepping motor 58 fixed on the body 1 is energized to turn the pulley 28 connected directly thereto so that the lens carriage to which are connected the two ends of the wire running on the pulley 28 is moved in the X direction and set in a predetermined position. As a result of the power transmission of the wire, the pulley 30 is rotated to turn the cam 85 to a predetermined position so that the block carriage 70 is also moved in the X direction and set in a predetermined position by a cam follower 86 contacting the cam 85. This movement set the initial position of the second carriage B, i.e., the V-mirror 5 and 6 in the X direction. Incidentally, the cam 85 and the cam follower 86 are held in contact with each other by the tension of a spring 71 which is tensed between the body 1 and the block carriage 70.

During the changing operation of the magnification M, moreover, either the motor 10 or the clutch brake attached to the motor has its operation interrupted. As a result, the pulley 11 is rotational to leave the first carriage unmoving so that it is not moved even when the magnification M is changed to any value but is always held on standby in a constant position.

If the lens carriage 40 is thus fixed in accordance with the set magnification M, the position of the block carriage and accordingly the position of the second carriage, i.e., the V-mirror 5 and 6 are determined, and the light distribution adjustment and the light amount adjustment are simultaneously accomplished by their adjustors 46 and 48, as will be described later, thus making preparations according to each magnification.

The pulleys 14, 16, 22 and 24 on the block carriage 70 are moved through the individual wires $W_1$ and $W_2$ with respect to the pulleys 15 and 13, and 23 and 21 which are pivotted by the shafts fixed on the body 1. As a result, the movement d of the block carriage in the X direction provides the movements of 3d of the wires $W_1$ and $W_2$ between the pulleys 13 and 21 and the pulley 12.

For the aforementioned change in the magnification of $M=0.5$ to 1 to 1.55, for example, the maximum difference of the initial positions of the V-mirror 5 and 6 is 58.75 mm. For this maximum difference, the movements of the wires $W_1$ and $W_2$ are $58.75\times2=117.5$ mm at the maximum, and the movement of the block carriage is $117.5\div3=39.16$ mm at the maximum. By setting these small strokes, the cam 85 is permitted to easily perform smooth operations with a little load. Thanks to the provision of the block carriage 70 and the interposition of the pulleys 15 and 23 fixed on the body, the movement of the block carriage 70 required for the change in the magnification and the stroke of the cam 85 can be reduced from 117.5 mm to one third, or 39.16 mm. This reduction can save the space and can contribute to the smaller size of the whole apparatus.

When an arbitrary magnification is set, the positions of the projection lens 7, the block carriage 70 and the V-mirror 5 and 6 are determined. When scanning is started, even a slight difference in tension upon the wires will establish an exceeding force to be exerted upon the block carriage. Especially, at the accelerating stage directly after the start of the driving motor a force several to ten times larger than a force at a stage of constant speed is applied. As a result, the cam and the cam follower on the block carriage are separated from each other, both separated are brought into contact again with each other with a shocking force or the contact and the separation are repeated during the scanning. Accordingly, the relation in position between the first carriage carrying the lamp as a light source for the exposure and the mirror 4 and the second carriage B carrying the mirrors 5 and 6 is deviated from the predetermined relation, so that only an image having a low resolving power can be formed. In the embodiment of the present invention, the resolving power of the image after the steps of the developing, transferring and fixing was 4 line/mm. Further, the cam and the cam follower may be dented and in certain cases they may be deformed so that a serious obstacle may be generated in the image focusing state.

Figure 6:
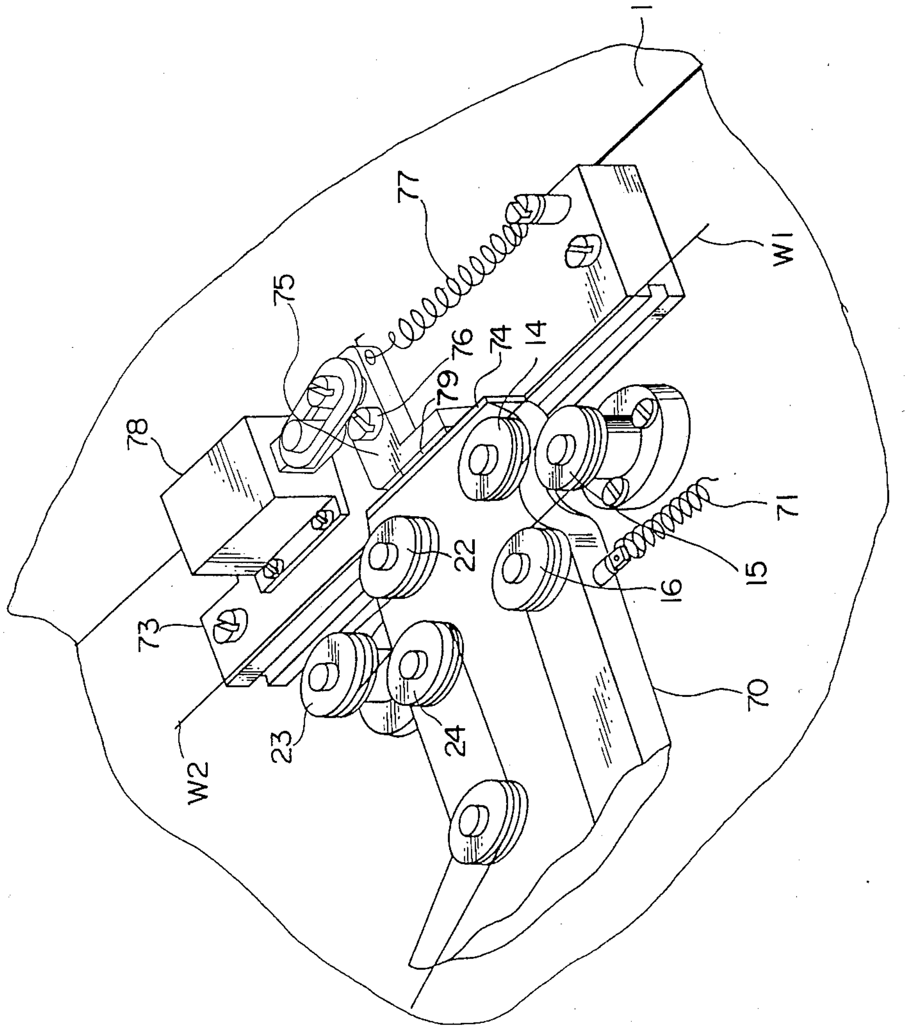
FIG. 6 is a perspective view showing an essential portion of the present invention.

Accordingly, as shown in FIGS. 1 and 6, fixing means is provided so that the block carriage 70 is made absolutely immovable during the scanning for the exposure. For this necessity, in the embodiment of the present invention, there is attached to the side of the block carriage a friction plate 74 made of rubber against which is provided a pushing plate 75 for the pushing and the releasing thereof at the machine frame side. On the pushing plate is attached a friction plate made of rubber which is similar to that attached on the side portion of the block carriage. A friction force is generated between both friction plates, because a pushing force is applied on the contact surface of both friction plates normally thereto by a spring 77, when the pushing plate 75 is pushed.

The reason why the friction plate is made of rubber is to obtain a high frictional coefficient. In the embodiment, the frictional coefficient of 2 to 2.5 could be obtained. As the rubber, a urethane rubber of polyesters is used, but urethane rubber of polyethers, silicone rubber, CR rubber or the like may be used. In the embodiment, the rubber of a hardness of 60° is used, however, the optimum value thereof is varied according to the kind of rubber, surface roughness, contact area and pushing force etc.

As shown in the drawings, a solenoid 78 and the spring 77 are provided as means for pushing said pushing plate and releasing the pushing. The solenoid is not energized other than the operation for changing the magnification, so that the pushing plate remains in the pushing state. The tension of the spring 77 is amplified according to the principle of lever rotatable on a fulcrum 76 and applied on the pushing portion, so that a vertical reaction force of about 20 N is applied between both friction plates. Accordingly, even if the spring 71 is not acted a force larger than the stational friction force of 40–50 N between the friction plates is required for moving the block carriage in such a direction that the cam and the cam follower are separated from each other.

It is necessary to move the block carriage according to the cam shape to a position corresponding to the specified magnification when changing the mangification, so that the solenoid is energized to release the pushing of the pushing plate during the movement of the block carriage. It is sufficient to set the attraction force by the solenoid at this state to a value a little higher than the sum of the tension of the spring 77 and a small friction force of the moving portion when the pushing is released. In the embodiment, it is sufficient to set about 5 N.

In the embodiment, a method of forming the friction force by the rubber is shown as means for fixing the block carriage which forms a part of the magnification changing means, however, instead of the rubber, resins, woods, fibers or metals which are provided with roulett or coated may be used. It may be considered further such methods that several projections of hard materials are pushed by a resilient member, such as rubber and foam materials etc., or that a rack is provided on the block carriage and a pinion including therein a one-way clutch is provided on the pushing plate, or the like. In case that the magnification is not changed to arbitrary values, but changed to several specified values on the contrary to the above embodiment, fixing means using holes and cutouts etc. and insertion pins and projections etc. may be used.

Incidentally, in the embodiment, this fixing means is disposed at one side, as shown in FIG. 1, but may naturally be provided symmetrically at both sides. In the present embodiment, moreover, the two mirrors are exemplified on the second carriage B, but the number of the mirrors should not be limited thereto.

Now, there are carried on the lens carriage 40 at the back of the projection lens 7 both the light distribution adjustor 46 which is made rotatable around a shaft 46' and the light amount adjustor 48 which is made rotatable around a shaft 48', as shown in FIG. 1.

The light distribution adjustor 46 is carried to a predetermined position together with the projection lens 7 in accordance wihh the magnification M by the action of the lens carriage 40. At this time, a frame 45 mounting the light distribution adjustor 46 thereon has its shaft 46' borne by bearings 41 and 42 so that a cam follower 52 at the leading end of a lever 51 attached to the end portion of the shaft 46' moves along a rail cam 57 fixed on the body frame 1 to turn the lever 51. Thus, by changing the angular position of the light distribution adjustor 46 sequentially according to a changing magnification, the distribution of the exposure is made uniform. In a frame 47 mounting the light amount adjustor 48 thereon, moreover, the cam follower 52 of a lever 50 attached to the end portion of the shaft 48' is also moved on the rail cam 57 of the body 1 in accordance with a changing magnification to turn the aforementioned lever 50 so that the light amount adjustor 48 acts to make the distribution of the exposure uniform and constant.

In the magnification changing mechanism of the image forming apparatus according to the present invention, the block on its carriage is allowed to play a role of a running block by moving the block carriage when changing the magnification so that the movement of the block carriage and the stroke of the cam for actuating the former can be drastically reduced. This reduction makes it possible to remarkably reduce the space to be occupied by and to accordingly extend the range for changing the magnification. Thus, the present invention can make a high distribution to the size reduction of the image forming apparatus of high performance.

If the magnification changing mechanism is actuated to set an arbitrary magnification, and the scanning for the exposure is started, each element in the optical system for focusing is not deviated from the normal focusing state, and especially the reduction in the resolving power in the scanning direction is prevented. In the embodiment, the resolving power becomes 6.3 line/mm.

It is sufficient to form a tension by the spring 71 a little higher than a force required for pushing the cam follower 86 against the cam 85, that is, the sum of the winding resistance of the wires and a small friction of the moving portion, so that the contact force between the cam and the cam follower can be set smaller than that in the conventional drvices. Thus, the resistance of the cam when it is rotated becomes small, so that the stepping motor 58 having a smaller torque for the magnification changing than that of the conventional motor can be used.

Accordingly, a compact optical system of wider magnification changing range for the image forming apparatus can be produced relatively easily and reliably at a reasonable cost.

What is claimed is:

1. An image forming apparatus with a magnification changing mechanism, comprising first running means carrying a lamp and a mirror for scanning an image of a document; second running means adapted to run in the same direction but at one half speed of said first running means and carrying a mirror for reflecting again a light reflected from said first running means; and an optical system for projecting the image of said document on an image retainer through said mirrors; wherein a portion of said magnification changing mechanism is fixed when said optical system is in an exposure operation.

2. The image forming apparatus according to claim 1, wherein said magnification changing mechanism is fixed by pressure means of a friction member arranged between a body frame and said portion of said magnification changing mechanism.

3. An image forming apparatus with a magnification changing mechanism, comprising first running means carrying a lamp and a mirror for scanning an image of a document; second running means adapted to run in the same direction but at one half speed of said first running means and carrying a mirror for reflecting again a light reflected from said first running means; and an optical system for projecting the image of said document on an image retainer through said mirrors; wherein means for changing the position of said second running means for changing the length of an optical path when the magnification is changed includes: a block carriage disposed at an end of a closed loop wire for driving said first and second running means; and a stationary block disposed on a body frame in a manner to correspond to adjoining blocks disposed on said block carriage, said wire being made to run on the blocks of said block carriage and said stationary block, the terminal end of said wire being fixed on said block carriage.

4. The image forming apparatus according to claim 1, wherein said magnification changing mechanism is fixed by pressure means of a friction member arranged between a fixing member of a body frame and said portion of said magnification changing mechanism.

* * * * *